(12) United States Patent
Halbritter

(10) Patent No.: US 11,097,524 B2
(45) Date of Patent: Aug. 24, 2021

(54) FLEXIBLE VACUUM SECUREMENT OF OBJECTS TO COMPLEX SURFACES

(71) Applicant: The Boeing Company, Chicago, IL (US)

(72) Inventor: Allen Halbritter, Charleston, SC (US)

(73) Assignee: The Boeing Company, Chicago, IL (US)

( * ) Notice: Subject to any disclaimer, the term of this patent is extended or adjusted under 35 U.S.C. 154(b) by 599 days.

(21) Appl. No.: 15/606,551

(22) Filed: May 26, 2017

(65) Prior Publication Data

US 2018/0339413 A1    Nov. 29, 2018

(51) Int. Cl.
*B29C 70/44*        (2006.01)
*B32B 37/10*        (2006.01)
*B29C 43/36*        (2006.01)
*B29C 70/54*        (2006.01)

(52) U.S. Cl.
CPC .......... *B32B 37/1018* (2013.01); *B29C 70/44* (2013.01); *B29C 43/3642* (2013.01); *B29C 70/54* (2013.01)

(58) Field of Classification Search
CPC ...... B29C 70/44; B29C 70/443; B29C 70/342
USPC .......................................... 156/285, 382, 60
See application file for complete search history.

(56) References Cited

U.S. PATENT DOCUMENTS

| | | | |
|---|---|---|---|
| 6,406,659 B1* | 6/2002 | Lang | B29C 33/0066 264/102 |
| 2006/0125155 A1* | 6/2006 | Sekido | B29C 70/547 264/511 |
| 2006/0246796 A1* | 11/2006 | Duffy | B29C 70/44 442/38 |
| 2009/0014618 A1* | 1/2009 | Bourrieres | H05K 13/0069 248/363 |
| 2010/0124654 A1* | 5/2010 | Smith | B29C 43/3642 428/317.9 |
| 2010/0137775 A1* | 6/2010 | Hu | G01L 9/10 602/54 |
| 2011/0118683 A1* | 5/2011 | Weston | A61F 5/048 604/319 |
| 2011/0282309 A1* | 11/2011 | Adie | A61F 13/0209 604/319 |
| 2014/0061962 A1* | 3/2014 | Lane | B29C 70/44 264/40.3 |
| 2015/0273809 A1* | 10/2015 | Thomas | B29C 70/44 156/285 |

(Continued)

FOREIGN PATENT DOCUMENTS

CN        102741040 A        10/2012

OTHER PUBLICATIONS

Composite Wet Layup found at: https://www.youtube.com/watch?v=fnRAshCRaQs (Year: 2010).*

(Continued)

*Primary Examiner* — Mahdi H Nejad
(74) *Attorney, Agent, or Firm* — Duft & Bornsen, PC

(57) ABSTRACT

Systems and methods are provided for vacuum handling of composite parts. One embodiment is a method for performing vacuum securement of an object. The method includes covering the object with an impermeable membrane, locating a vacuum port at the impermeable membrane, and applying a negative pressure to the vacuum port that offsets air leaks between the impermeable membrane and the object.

27 Claims, 13 Drawing Sheets

(56) References Cited

U.S. PATENT DOCUMENTS

2017/0050393 A1 2/2017 Duclos et al.

OTHER PUBLICATIONS

U.S. Appl. No. 14/936,870.
Chinese Office Action; Application 201810479529.4; dated Apr. 21, 2021.

* cited by examiner

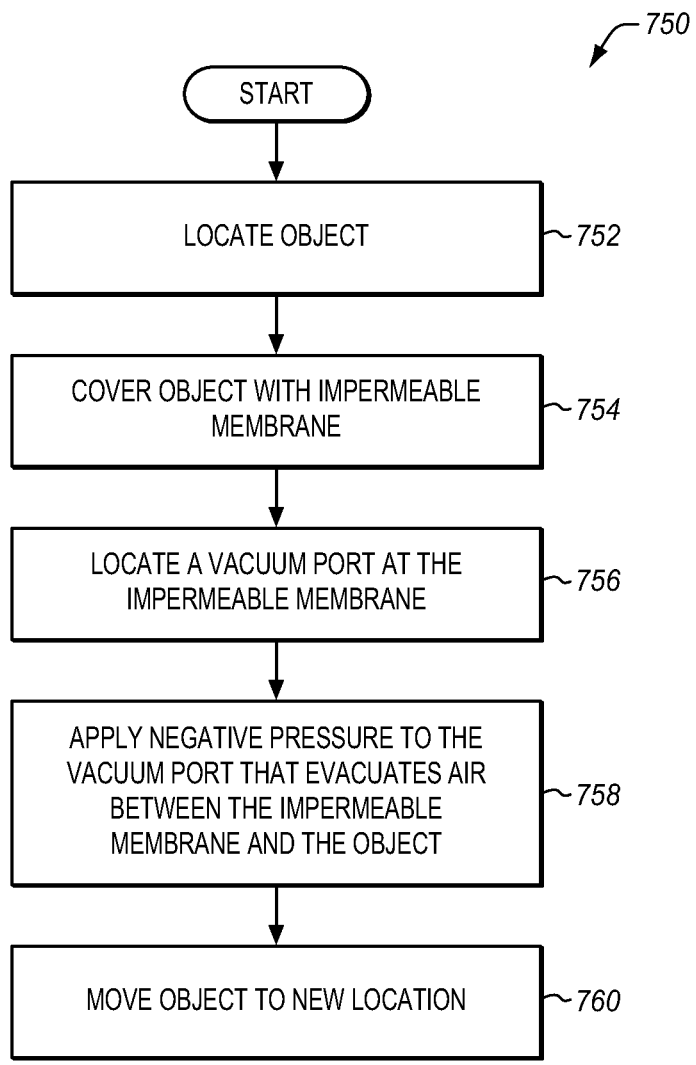

FLEXIBLE VACUUM SECUREMENT OF OBJECTS TO COMPLEX SURFACES

FIELD

The disclosure relates to the field of assembly, and in particular, to assembly of smaller parts onto larger parts in a manufacturing environment.

BACKGROUND

Composite parts, such as Carbon Fiber Reinforced Polymer (CFRP) parts, are initially laid-up in multiple layers that together form a laminate. Individual fibers within each layer of the laminate are aligned parallel with each other, but different layers may exhibit different fiber orientations in order to increase the strength of the resulting composite along different dimensions. The laminate includes a thermoplastic or themoset resin that solidifies in response to changes in temperature in order to harden the laminate into a composite part (e.g., for use in an aircraft).

A laminate that has been hardened into a composite part exhibits full structural strength. Thus, a laminate may be incapable of supporting itself as laid-up onto a surface (e.g., a vertical or other non-horizontal surface) before it is hardened. This may complicate the layup of large laminates onto complex surfaces (e.g., barrel shapes), because it increases the chance of a portion of a laminate peeling off or shifting off of the forming tool before layup has been completed. Hence, accurate placement or locating of large and/or unwieldy layups is difficult. For laminates that are cured via vacuum bag curing techniques, an increased amount of labor may be involved in securing a vacuum bag around the laminate before the laminate peels away from (or shifts relative to) a corresponding complex surface. Further complicating the issue, materials such as tacky tape used to secure the vacuum bag to the tool surface are not contact approved and hence are not allowed to touch the uncured composite material. As a result the entire layup must be completed prior to the application of the vacuum bag and affixation of the vacuum bag via sealant to the complex surface. Thus, it remains desirable to quickly and effectively secure laminates (and/or other objects) to complex surfaces, particularly when laminates are being arranged into complex assemblies. Another notable issue is that it is desirable to move "green" composite structures from a forming tool to an assembly location without applying sealant to seal a vacuum bag to the "green" composite structure. Therefore, it would be desirable to have a method and apparatus that take into account at least some of the issues discussed above, as well as other possible issues.

SUMMARY

Embodiments described herein provide high volume vacuum systems that quickly and effectively secure objects such as laminates to complex surfaces without the need for glue or fasteners, and without damaging the objects. These vacuum systems provide a benefit even in cases where a tackifier has been applied to a tool surface which will hold the laminate in place. This results from the fact that, over time, if the laminate is stored in a non-horizontal position, the laminate may move. That is, the applied vacuum is responsible for securing the object in place. This beneficially increases the speed at which an object may be secured. Furthermore, large objects may be secured piecewise in rapid fashion, which eliminates the chances of a large object drooping or peeling off of a forming tool having a complex surface.

One embodiment is a method for performing vacuum securement of an object. The method includes covering the object with an impermeable membrane, locating a vacuum port at the impermeable membrane, and applying a negative pressure to the vacuum port that offsets air leaks between the impermeable membrane and the object.

A further embodiment is a non-transitory computer readable medium embodying programmed instructions which, when executed by a processor, are operable for performing a method for performing vacuum securement of an object. The method includes covering the object with an impermeable membrane, locating a vacuum port at the impermeable membrane, and applying a negative pressure to the vacuum port that offsets air leaks between the impermeable membrane and the object.

A further embodiment is a system that includes an impermeable membrane, a vacuum port at the impermeable membrane, and a pump that applies a negative pressure to the vacuum port which evacuates air between the impermeable membrane and an object, the negative pressure directly securing the impermeable membrane by evacuation of air between the object and the impermeable membrane.

A still further embodiment is an apparatus that includes an impermeable membrane, a vacuum port penetrating through the impermeable membrane, and a pump coupled with the vacuum port that provides sufficient volumetric flow to offset air leaks at edges of the impermeable membrane when the impermeable membrane is placed against a surface.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 7A-7B are flowcharts illustrating a method for operating a vacuum securement system in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
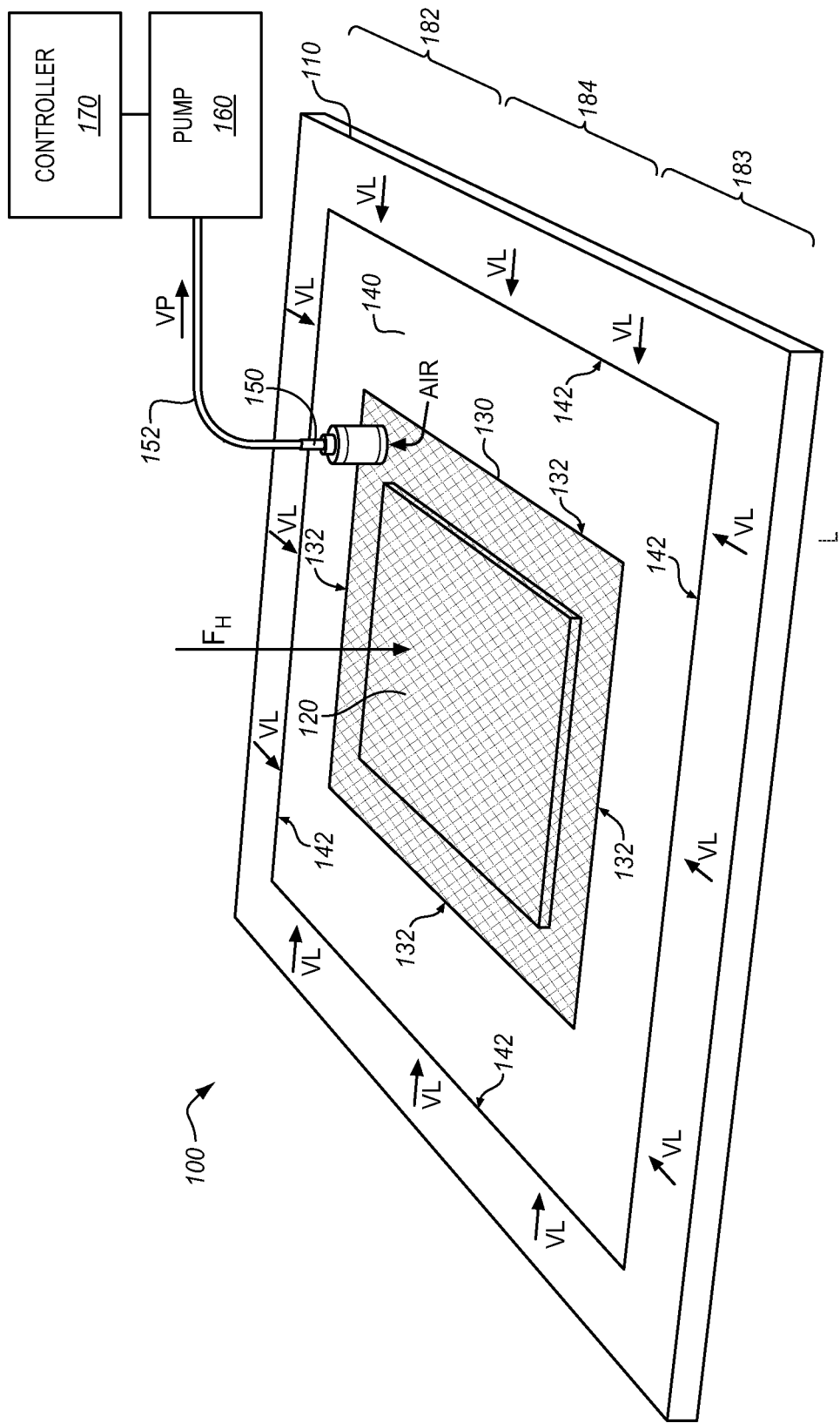
FIG. 1 is a diagram illustrating a vacuum securement system in an exemplary embodiment.

FIG. 1 is a diagram of a vacuum securement system 100 in an exemplary embodiment. Vacuum securement system 100 comprises any system, device, or component operable to utilize negative pressure (e.g., suction) in order to secure an object to a complex surface. Specifically, vacuum securement system 100 draws air from underneath impermeable membrane 140 (e.g., a latex sheet or other material that exhibits high levels of elongation while retaining impermeability) that covers object 120. This action creates negative pressure that secures impermeable membrane 140 to forming tool 110. The negative pressure also forces membrane 140 snugly over object 120, which ensures that object 120 remains in place at forming tool 110. A permeable layer 130 is placed between object 120 and membrane 140. Permeable layer 130 is both laterally and vertically air permeable, which means that negative pressure drawn via port 150 is applied evenly across object 120 instead of being localized at port 150. In this embodiment, port 150 is located at an upper end portion 182 of membrane 140. However, port 150 may be located as desired at center portion 184 of membrane 140, at a lower end portion 183, or at other portions. Port 150 may directly contact or be directly positioned over permeable layer 130.

Pump 160 draws air from between membrane 140 and object 120. This air travels through hose 152 and is ejected into the surrounding environment. Pump 160 is a high flow volume pump, which means that pump 160 is capable of drawing a great deal of air through hose 152, but not necessarily at a high pressure. In one embodiment, pump 160 applies twenty two to twenty nine inches of mercury (in. Hg) of negative pressure to form a vacuum, but at tens of Cubic Feet per minute (CFM) of airflow (e.g., between fifty and two hundred CFM), which is withstood by port 150. Hence, pump 160 and port 150 may be capable of maintaining a pressure of at least one inch of mercury across the impermeable membrane (e.g., the covered area). This may be performed solely by pump 160, or in combination with other pumps as desired. The amount of pressure applied and amount of CFM drawn by pump 160 may vary as a function of total boundary length (L) of membrane 140. Controller 170 manages the operations of pump 160 based on input from a sensor (not shown) such as a pressure sensor or flow rate sensor, in order to ensure that vacuum is constantly within a desired range to overcome leaks along the perimeter of membrane 140. Sensors may be located at any suitable location, such as at permeable layer 130, membrane 140, port 150, pump 160, etc. For example, controller 170 may increase or decrease a speed or intensity of pumping operations in order to maintain a constant volume flow of air, or in order to maintain a constant negative pressure. Controller 170 may be implemented, for example, as custom circuitry, as a hardware processor executing programmed instructions, or some combination thereof.

The amount of holding force ($F_H$) applied by membrane 140 to object 120 is based upon the difference between a volume per unit time drawn by pump 160 (VP), a volume per unit time at which air leaks through ends 142 of membrane 140 (VL), and a total area covered by membrane 140. $F_H$ may also be modeled as a function of the pressure applied by pump 160. VL is overcome by VP. Hence, VP should be equal to or larger than VL. To ensure that this result is achieved, ends 142 of membrane 140 may extend beyond ends 132 of permeable layer 130. Membrane 140 is not affixed to forming tool 110 via sealant, glue, fasteners, magnetism, etc. However, vacuum under membrane 140 is maintained by pump 160 while air is leaking into the system through the perimeter. Thus, minor air leaks may still exist in this configuration, because negative pressure is the primary (e.g., sole) force that secures membrane 140 to forming tool 110. The air leaks may be caused by wrinkles in membrane 140 that provide passages for airflow. However, wrinkles are but one cause of air leaks, as air will leak out of the edge of membrane 140 when membrane 140 is not sealed to forming tool 110. Even so, VL remains small, and hence negative pressure is maintained by evacuating an equal or greater amount of air than is lost via leaks between ends 142 of impermeable membrane 140 and forming tool 110.

Object 120, which is secured in place by membrane 140, may comprise an uncured fiber reinforced laminate comprising multiple layers of Carbon Fiber Reinforced Polymer (CFRP), a "green composite" or any other suitable component including rigid ones such as a metallic component or component made from other materials. Permeable layer 130 comprises a material that is capable of deforming as membrane 140 applies force, drawing snugly over object 120 while still enabling air to be drawn freely across object 120. That is, permeable layer 130 enables the drawing of air across object 120 without causing markoff or leaving some type of undesirable mark upon object 120. For example, permeable layer 130 may comprise a compliant biplanar mesh of material that facilitates airflow. Permeable layer 130 is a high-flow material, which is to say that permeable layer 130 does not substantially restrict the rate at which pump 160 draws air. The resistance of permeable layer 130 to airflow therefore has a negligible impact on the flow rate of pump 160. In some embodiments, permeable layer 130 comprises an open celled foam material. However, in such embodiments, the open celled foam material chosen must be sufficiently rigid that it does not collapse under membrane 140, and sufficiently open that airflow is not inhibited. Collapsing of membrane 140 would shut off or restrict air flow, which is undesirable as air flow would then be restricted from such areas under membrane 140. Membrane 140 may comprise any suitable gas-impermeable material that is pliable. For example, membrane 140 may comprise a plastic sheet that prevents air from escaping directly through it. In further embodiments, membrane 140 and permeable layer 130 may be structurally united or bonded for convenience. Both permeable layer 130 and membrane 140 may comprise contact approved materials that are acceptable for use with carbon fiber composites and do not chemically interact with resin.

Figure 2:
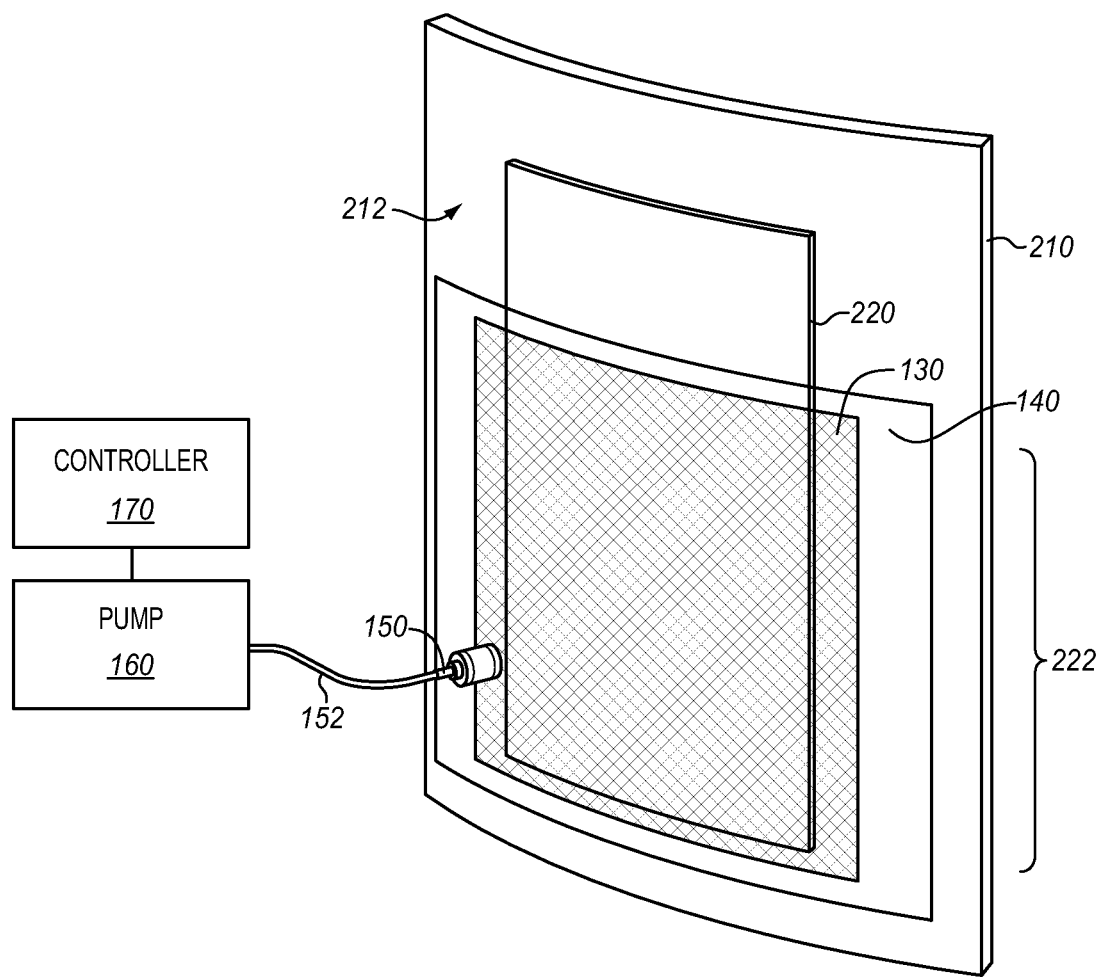
FIGS. 2-5 are diagrams illustrating operation of a vacuum securement system to secure portions of a laminate in an exemplary embodiment.

With a discussion provided above of the various components involved in vacuum securement system 100, FIGS. 2-5 illustrate use of vacuum securement system 100 in phases to secure a large object to a complex forming surface. FIG. 2 illustrates that after object 220 is placed onto curved surface 212 of forming tool 210 (which may also be referred to as a mandrel), object 220 may be subject to forces (e.g., from gravity) that will cause object 220 to droop or otherwise peel away from forming tool 210. Vacuum securement system 100 is therefore utilized by draping permeable layer 130, followed by membrane 140, over object 120. A vacuum may then be quickly drawn via vacuum port 150 to secure a first portion 222 of object 220, and may be done so without sealing membrane 140, to object 220, or to other components. If desired, membrane 140 may then be pulled laterally before or during application of vacuum to eliminate any wrinkles thereon.

Figure 3:
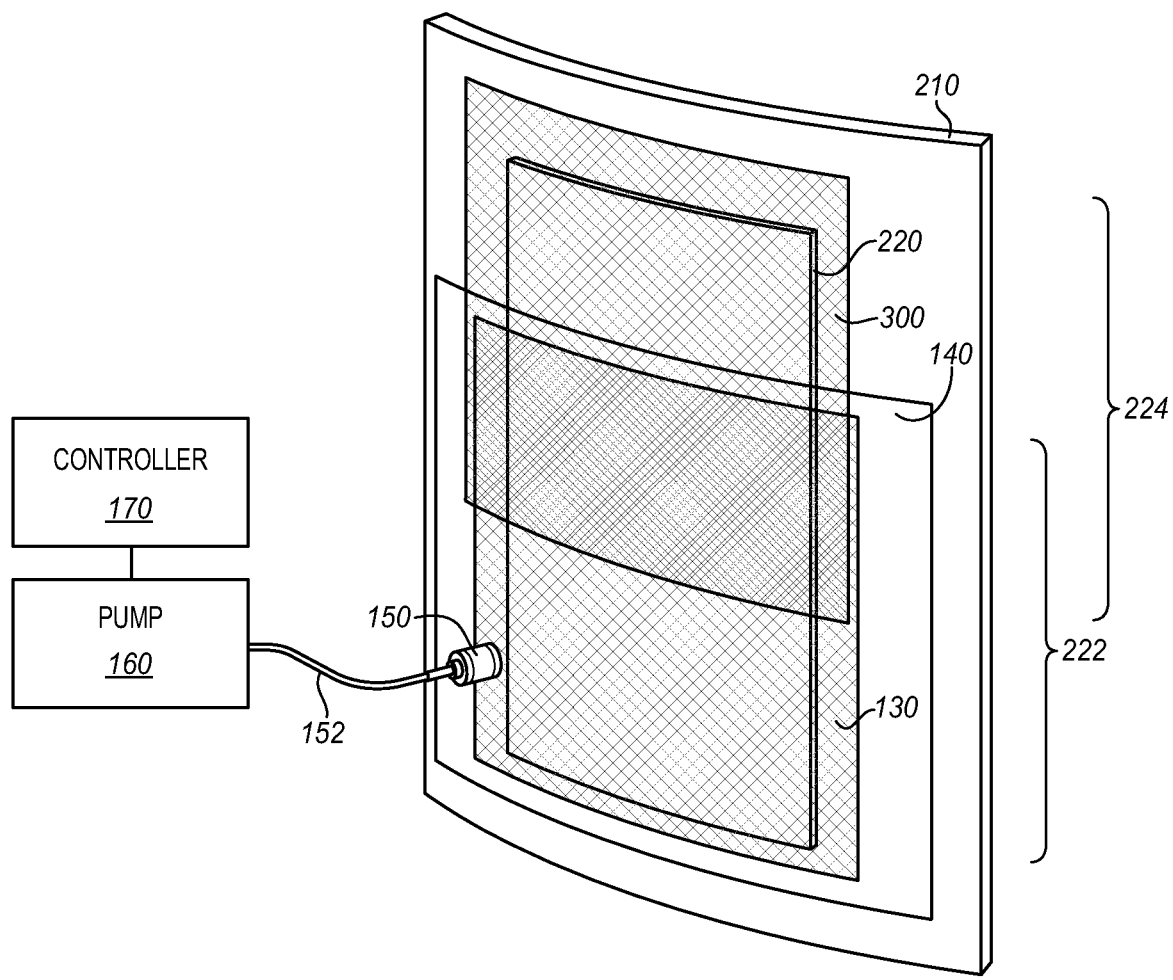
Figure 4:
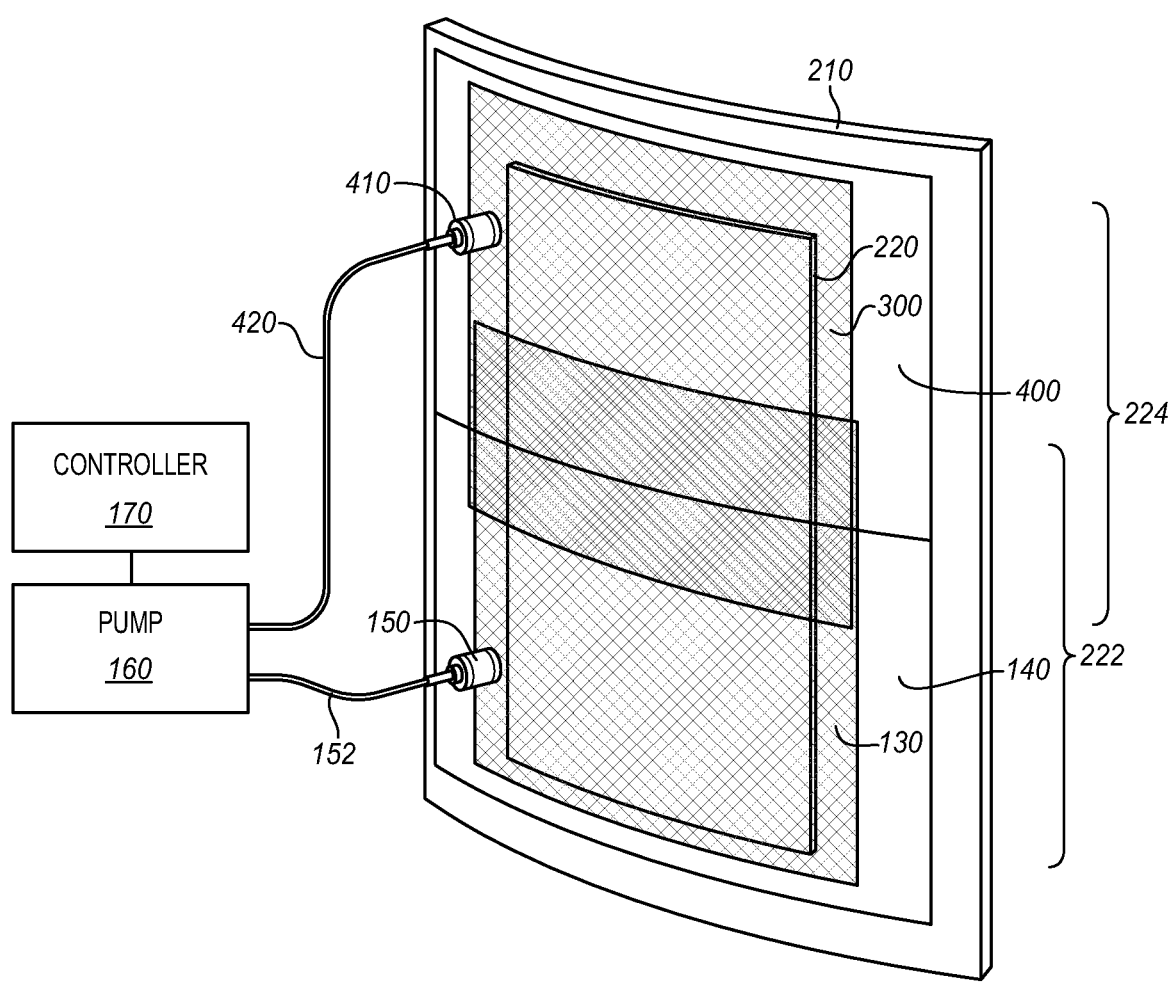

FIG. 3 illustrates a next step that may be performed in order to secure another portion of object 220. In this embodiment, another permeable layer 300 is placed on top of portion 224 of object 220. Permeable layer 300 is inserted partially underneath membrane 140, which temporarily increases load at pump 160 by increasing VL. However, this is only a temporary measure. FIG. 4 illustrates that an additional impermeable membrane 400 is placed on top of permeable layer 300. At this point, VL is substantially reduced, as membrane 400 and membrane 140 will pressure seal against each other and forming tool 210. In this embodiment, another port 410 may be placed at membrane 400, and air may be drawn out via hose 420. However, the use of an additional port is optional in this circumstance, since the entirety of object 220 is now within a single volume from which air may be drawn, and permeable layers 130 and 300 facilitate airflow across the entirety of object 220.

Figure 5:
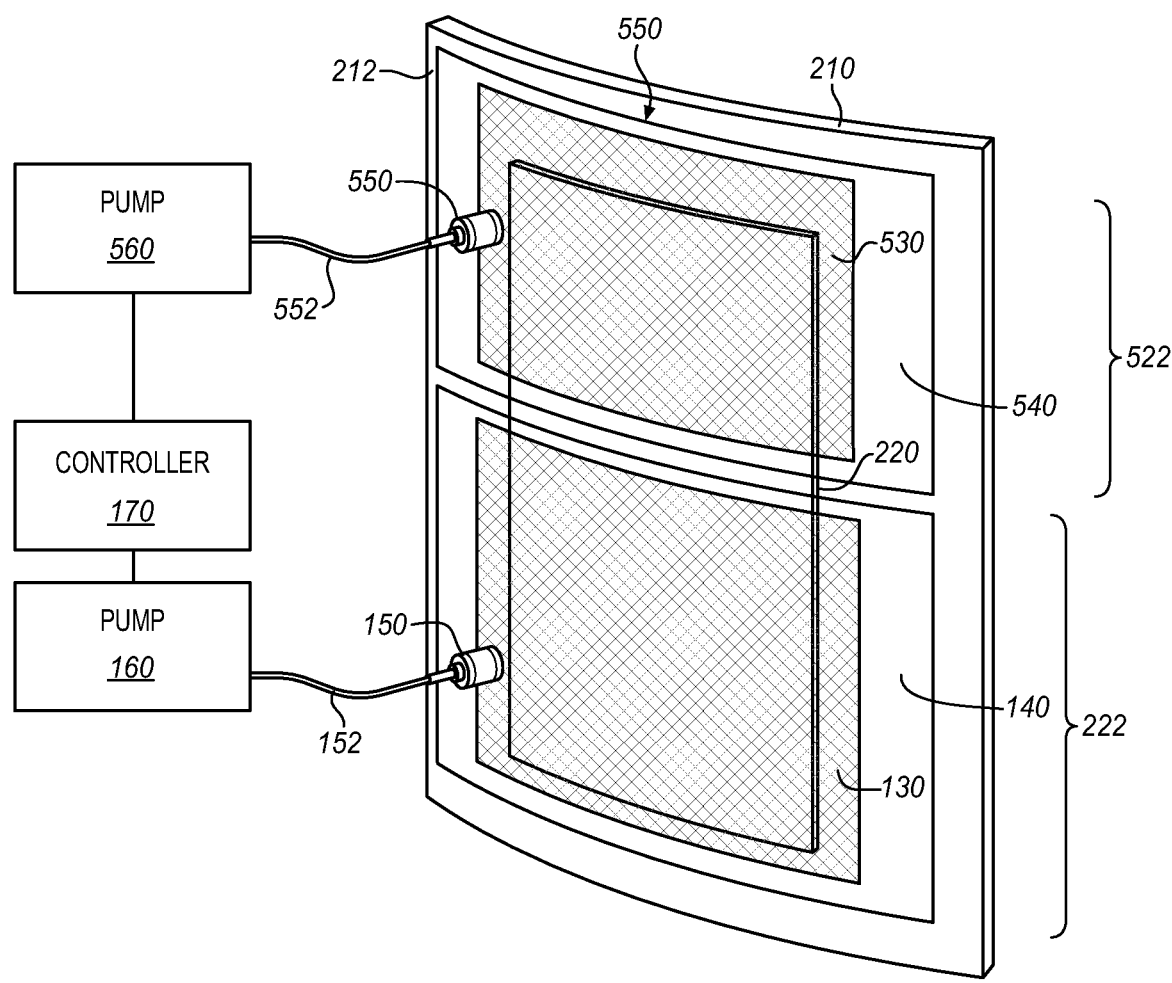

FIG. 5 illustrates an alternative technique for securing another portion of object 220 from FIG. 2. In this embodiment, another permeable layer 530, and another membrane 540, are applied over an entirely separate portion 522 of object 220. Air is drawn by pump 560 via vacuum port 550 and hose 552, resulting in a vacuum-based securement 550. In this embodiment, even though object 220 is partially exposed, the chance of object 220 drooping or peeling away from forming tool 110, membrane 140, and/or permeable layer 130 has been eliminated. Further portions may be secured in this manner in order to bridge the initial portions into a unified whole. In further embodiments, these techniques may be utilized to secure one or more objects to a forming tool 210 that rotates and is barrel shaped (e.g., as a progressive and/or additive application of a vacuum bag system).

Rapid securement of an object as described in FIGS. 1-5 is advantageous. For large laminates stretching for tens or hundreds of feet, this increase in securement speed means that the chances of drooping or peeling may be substantially reduced, which in turn reduces the overall labor involved in producing a resulting composite part. That is, the systems and techniques described herein allow for rapid pick and placement of bulky and/or large objects without the need to mark a surface of the object or otherwise take a substantial amount of set up time. A technician may for example pick up a "green" state laminate from a mandrel using the securement techniques described herein. The green laminate may further be placed onto a forming tool as part of an assembly to be cured and the securement may be rapidly released. The reduced amount of drooping or peeling facilitated by these systems also reduces wrinkle formation at object 220, which enhances strength. Hence, rapid securement helps to ensure desired structural strength in a resulting composite part, and also allows for a quick pick and placement operations without the use of sealant or otherwise marking the object being picked up.

Figure 6:
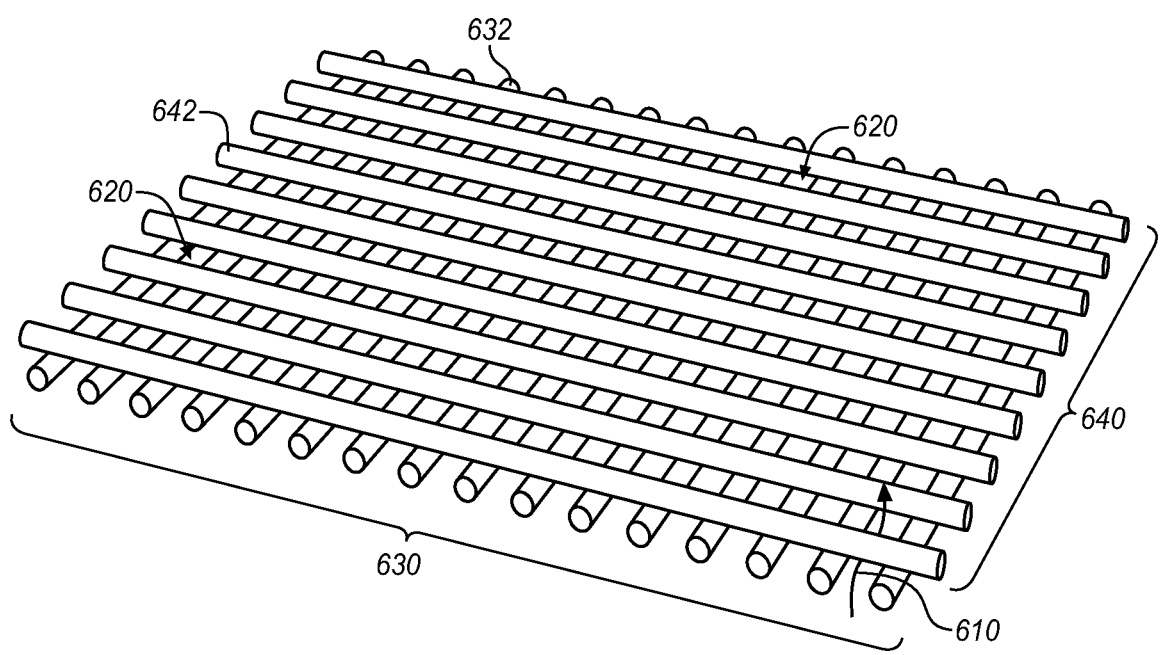
FIG. 6 is a perspective view of a permeable layer that is both vertically and laterally air-permeable.

FIG. 6 is a perspective view of a permeable layer 600 that is both vertically and laterally air-permeable. That is, air 610 may flow freely through gaps 620 in permeable layer 600, as well as across gaps 620 in permeable layer 600. This is possible because permeable layer 600 is a biplanar mesh. A first layer 630 of the biplanar mesh comprises structural elements 632 that are arranged parallel with each other, and a second layer 640 of the biplanar mesh comprises structural elements 642 that are arranged parallel with each other, but in a different direction than layer 630. Layer 630 enables air to flow horizontally in a first direction, and layer 640 enables air to flow horizontally in a second direction. Meanwhile, both layers allow air to flow freely vertically. Thus, if a negative pressure is applied to one portion of permeable layer 600, the negative pressure may draw air evenly across the entirety of permeable layer 600. Permeable layer 600 enables free airflow, and does not interfere with the drawing of air by pump 160. That is, permeable layer 600 does not limit the CFM rate of pump 160. Permeable layer 600 may comprise polyethylene, polypropylene, nylon, etc. In one embodiment, permeable layer 600 is chosen as a "contact approved" material that will not chemically interfere with the adhesion of curable resin at the object being secured. For example, permeable layer 600 may be made from a silicone free material that does not mark object 220.

Illustrative details of the operation of vacuum securement system 100 will be discussed with regard to FIG. 7. Assume, for this embodiment, that an object 120 such as a multilayer laminate has been placed onto a forming tool having a complex surface from which the object 120 is prone to droop or peel. An example of such a forming tool may be a barrel shaped forming tool.

Figure 7A:
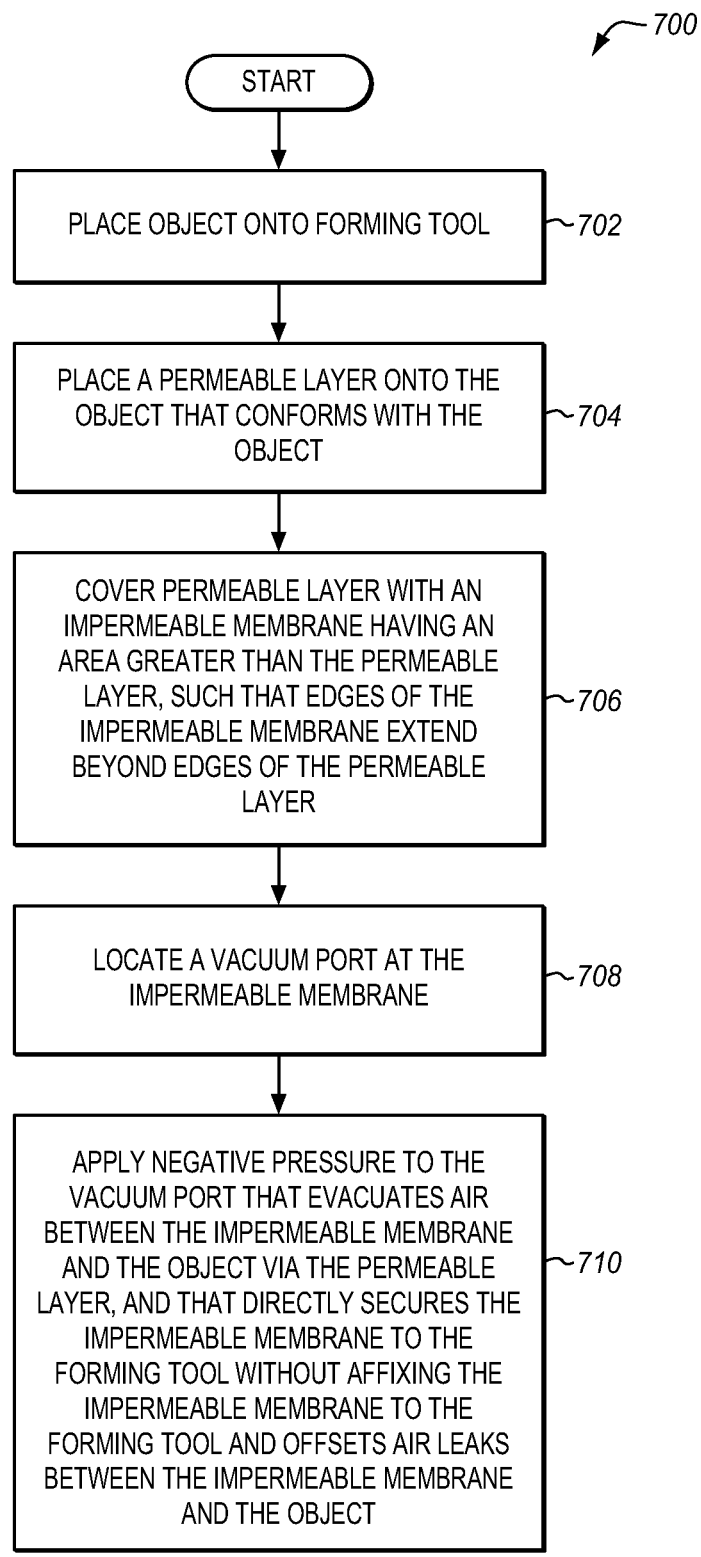

FIG. 7 is a flowchart illustrating a method 700 for operating a vacuum securement system in an exemplary embodiment. The steps of method 700 are described with reference to vacuum securement system 100 of FIG. 1, but those skilled in the art will appreciate that method 700 may be performed in other systems. The steps of the flowcharts described herein are not all inclusive and may include other steps not shown. The steps described herein may also be performed in an alternative order.

Object 120 is placed onto forming tool 110 (step 702). This operation may be performed, for example, via robotic devices based on instructions from controller 170 in accordance with a Numerical Control (NC) program for controlled composite tape layup. Permeable layer 130 is placed onto object 120, and conforms to the shape of object 120 (step 704). It may be possible to skip this step in embodiments wherein a support structure (e.g., frame 1030 of FIG. 10) provides sufficient support to ensure that there is sufficient air flow for a desired level of vacuum to offset air leaks along the perimeter. The support structure may ensure desired separation from object 120, while edges of membrane 140 are held in place via suction. Permeable layer 130 is both laterally and vertically air-permeable. Permeable layer 130 therefore ensures that a sufficient volume of air moves across object 120 to apply negative pressure evenly across object 120, instead of being localized at vacuum port 150. Permeable layer 130 is covered with membrane 140, which is gas impermeable (step 706) Membrane 140 has a surface area that is greater than permeable layer 130, and is placed such that ends 142 of membrane 140 extend beyond ends 132 of permeable layer 130. This ensures that membrane 140 is drawn securely by negative pressure directly onto forming tool 210. In further embodiments where object 120 is to be secured to a pick and place device instead of forming tool 110, membrane 140 does not extend beyond ends 142 of object 120. If membrane 140 did not extend beyond ends 132 of permeable layer 130, air flow would penetrate underneath membrane 140 via permeable layer 130.

The arrangement discussed above allows for securement of object 120 without sealant, for example such that quick installation and removal of a vacuum bag and breather is possible. This arrangement, because of its use of negative pressure, also allows for the securement to be performed without marking object 120. Such an arrangement could also be theoretically used for curing, but may be difficult to maintain during the curing cycle and hence may not consistently produce a cured part having the desired quality.

A vacuum port 150 is located at membrane 140 (step 708). In this manner, either object 120 and/or forming tool 110 combine with membrane 140, resulting in a vacuum chamber. For example, vacuum port 150 may have been previously secured to membrane 140, or a hole in membrane 140 may be cut and vacuum port 150 secured thereto. In a further embodiment, vacuum port 150 is located at forming tool 110, however vacuum port 150 does not have to be located at 110, as long as it is located along permeable layer 130. Hose 151 is coupled to vacuum port 150, and negative pressure is applied to vacuum port 150 by pump 160 (step 710). This negative pressure evacuates air between membrane 140 and object 120. Permeable layer 130 mediates the evacuation of air, ensuring that air flows sufficiently across object 120 to promote vacuum. Furthermore, the negative pressure directly secures membrane 140 to forming tool 110 (or, in pick-and-place embodiments, to object 120). Specifically, portions of membrane 140 that extend beyond permeable layer 130 are pulled down against object 120 and/or forming tool 110 to form a vacuum-based securement 550 that does not prevent all air incursion. This is performed without affixing membrane 140 to forming tool 110. That is, no intervening component such as a sealant, glue, tape, fastener, etc. is used. Hence, membrane 140 is secured in place without being affixed (e.g., sealed with sealant, fastened or glued) in place.

Method 700 provides a substantial advantage in that it enables rapid securement of objects to complex surfaces. Furthermore, method 700 enables securement to be performed on a piecewise basis, and without the need for tape, sealant, glue, fasteners, etc. This benefit is especially valuable when securing large laminates in place. The technique may even be utilized to rapidly consolidate and/or compact multi-layer laminates. Since membrane 140 applies force across the surface of object 120, due to the differential of pressure outside of membrane 140 compared to pressure inside membrane 140, such consolidation techniques ensure that underlying laminate is not deformed in an unexpected manner during consolidation. While consolidation of object 120 against forming tool 110 via vacuum is described, consolidation may be performed against any suitable surface underlying object 120. This technique may also be utilized by a pick and place machine to move an object 120 between forming tools. Without the use of sealant, permeable layer 130 and membrane 140 can be quickly placed relative to object 120 and removed just as quickly, but still facilitate pick and placement or consolidation of object 120 if desired. Without the use of sealant, there is no markoff/marking upon object 120. Furthermore, set up time and breakdown time for using sealant is no longer needed. Pick and place techniques may be used on "green" laminates as well as other more rigid structures such as cured composites, metallics or other materials.

A method 750 for pick-and-placement of an object 120 is provided at FIG. 7B. According to FIG. 7B, object 120 is located in step 752, and covered by impermeable membrane 140 in step 754. In some embodiments, step 754 may be skipped if a support structure (e.g., frame 1030 of FIG. 10) provides enough support to ensure that there is sufficient air flow to support a desired level of vacuum and while still offsetting air leaks along the perimeter. The support structure could ensure a desired separation between object 120 and membrane 140. In this embodiment, membrane 140 does not extend beyond the ends of object 120. In a further embodiment a permeable layer may be optionally placed between the impermeable membrane and the object. Vacuum port 150 at impermeable membrane 140 is located in step 756, and negative pressure is applied to vacuum port 150 that evacuates air between impermeable membrane 140 and object 120 (step 758). This results in a further step comprising forming a vacuum securement between membrane 140 and object 120, or forming a vacuum securement between membrane 140 and forming tool 110 in response to the vacuum being drawn. The vacuum securement is accomplished where air movement is possible owing to the support structure and/or permeable layer. Object 120 is then moved to a new location (step 760), and is held in place to impermeable membrane 140 during movement by the negative pressure. The negative pressure may then be released to enable withdrawal of impermeable membrane 140 from object 120.

Figure 8:
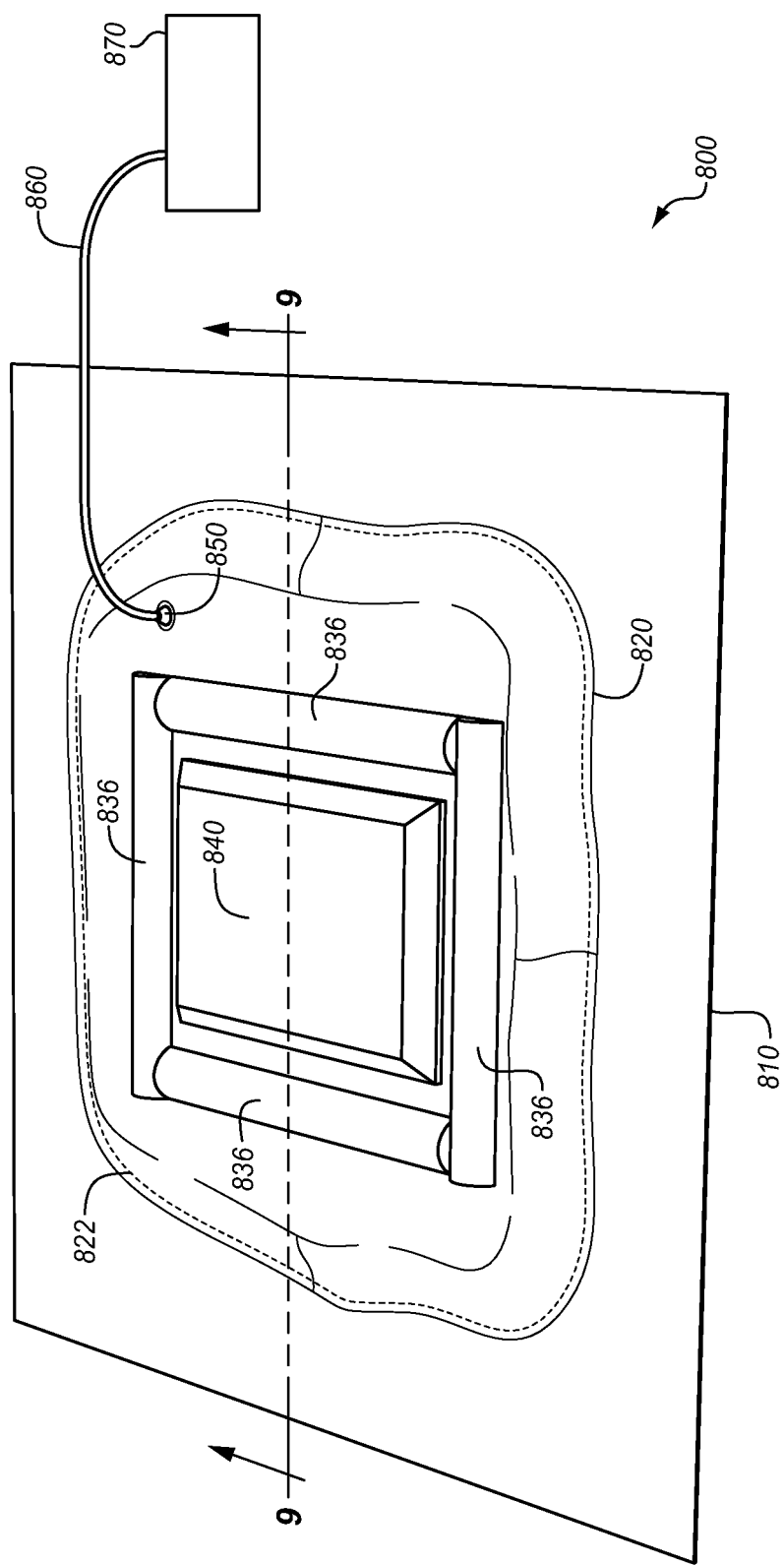
FIGS. 8-9 are diagrams illustrating a vacuum securement system that supplements a vacuum bag curing system in an exemplary embodiment.

The rapid securement techniques provided by vacuum securement system 100 may also be utilized in order to enhance vacuum bagging techniques for curing laminates. FIG. 8 illustrates a vacuum bag manufacturing system 800 in an exemplary embodiment. System 800 comprises any combination of components and/or devices that are capable of utilizing vacuum bag techniques to consolidate, form, and/or cure a laminate 840 into a composite part (e.g., a fiber reinforced composite part such as an aircraft wing or any other suitable component).

In this embodiment, system 800 includes forming tool 810, which forms a surface about which laminate 840 conforms to during manufacturing. Laminate 840 may comprise a "prepreg" carbon fiber laminate that already includes a thermoset or thermoplastic resin, or any suitable curable laminate. As shown in FIG. 8, laminate 840 is held in place on tool 810 via vacuum bag 820, which is taped/sealed via end sealant 822 to surround laminate 840 on tool 810. Edge breathers 836 surround laminate 840 and are sealed to laminate 840 via vacuum bag 820. Edge breathers 836 provide passageways for air from the curing process to travel within vacuum bag 820. Air then exits vacuum bag 820 via port 850, which operates as a fitting for vacuum line 860. Vacuum line 860 is powered in this embodiment by compressor 870.

While in operation in one embodiment, compressor 870 may evacuate air from vacuum bag 820. Removing the air under vacuum bag 820 allows atmospheric pressure to press the vacuum bag against the laminate 840. This holds vacuum bag 820 against laminate 840 to conform laminate 840 to tool 810. The pressure also causes vacuum bag 820 to tightly conform to the edge breathers 836. This provides a benefit in holding laminate 840 tightly against the contours of tool 810 as laminate 840 cures, and also provides a benefit in that it draws out air bubbles that would otherwise be formed during the curing process. The curing process itself may further involve the application of substantial amounts of pressure and/or heat (e.g., within an autoclave).

Figure 9:
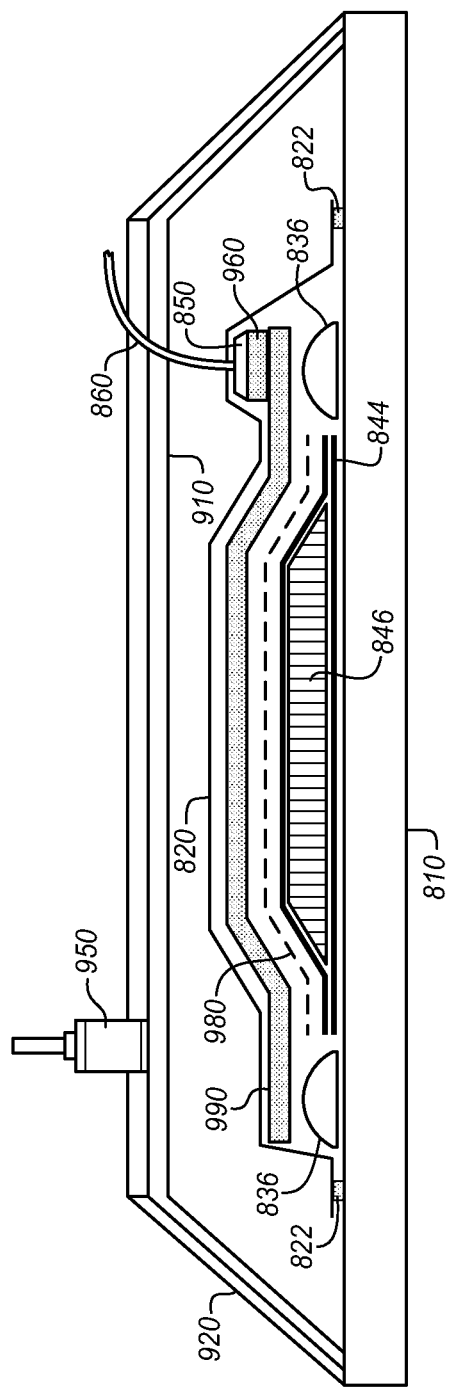

FIG. 9 is a section cut side view of system 800 in an exemplary embodiment, and includes a vacuum securement system 900 which is placed atop system 800. This view is represented by view arrows 9 of FIG. 8. FIG. 9 illustrates that vacuum securement system 900 is placed over system 800, and includes permeable layer 910, as well as vacuum bag 920. A port 950 is provided via which a negative pressure may be applied. In this manner, if any unexpected leaks are encountered during the operation of system 800, vacuum securement system 900 prevents air from remaining within vacuum bag 820. In such embodiments, it may be beneficial to ensure that permeable layer 910 is temperature-resistant.

System 800 could be used to save an expensive preform if vacuum bag 820 for that preform has a leak. If vacuum bag 820 does not have a leak, then the amount of vacuum in the outer vacuum chamber under vacuum bag 920 is kept lower than the vacuum used for the system of FIG. 8. This prevents vacuum bag 820 from being pulled away from the preform and not providing the desired level of vacuum. This double bagging may also be used during resin infusion of a preform, wherein vacuum bag 920 could be removed quickly at any time desired.

Figure 10:
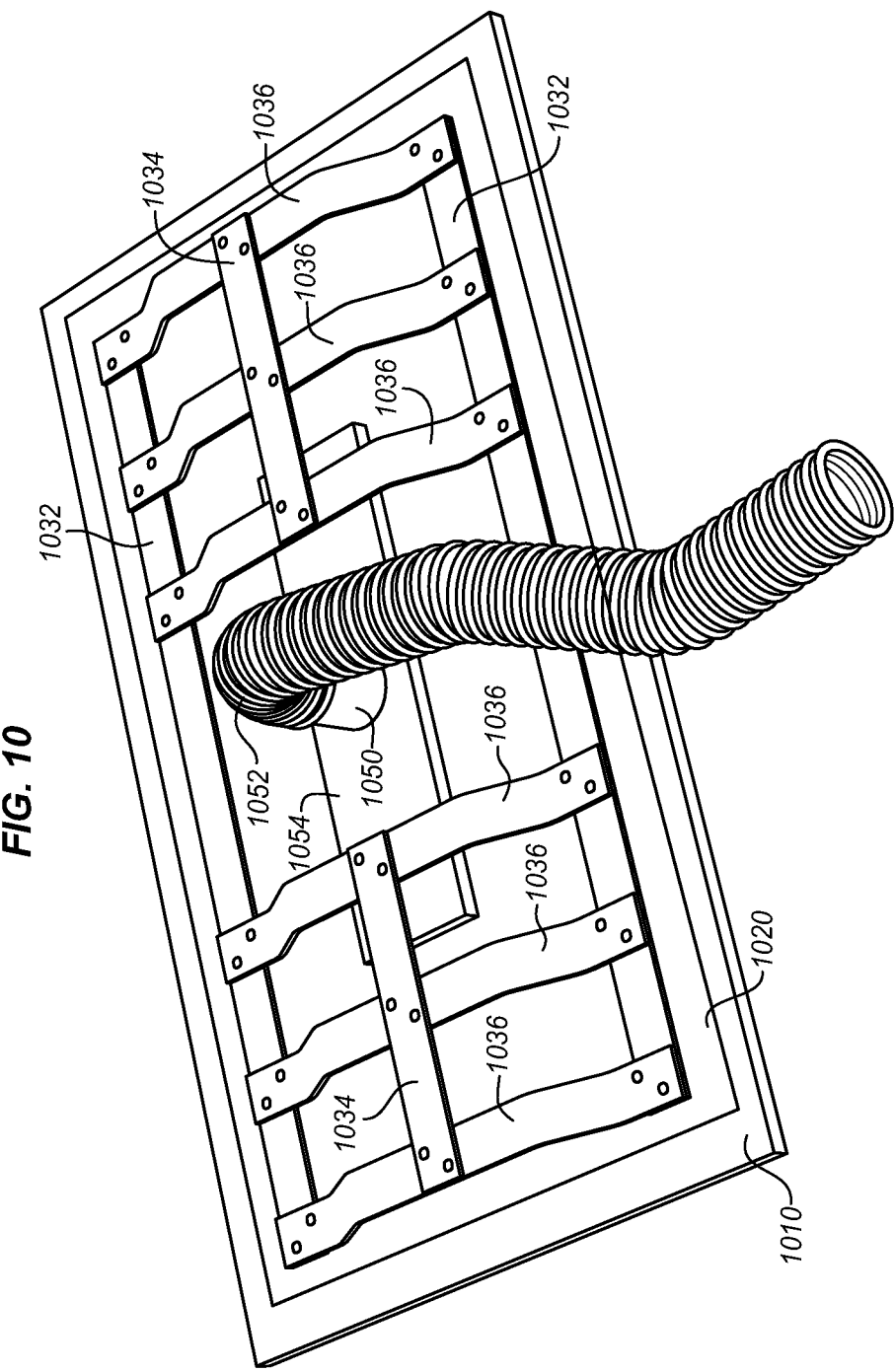
FIG. 10 is a perspective view of a frame that facilitates application of vacuum for a vacuum securement system in an exemplary embodiment.

FIG. 10 is a perspective view of a frame 1030 that facilitates application of vacuum for a vacuum securement system in an exemplary embodiment. In this embodiment, frame 1030 is external to membrane 1020. Frame 1030 may be affixed to membrane 1020 via air-impermeable fasteners, adhesive, etc. In this manner, frame 1030 secures membrane 1020 in a predetermined configuration. Frame 1030 includes lateral members 1032, and further includes vertical members 1036 which are fixed to lateral members 1032 and each form an arch. Capstone members 1034 couple individual vertical members 1036. Vacuum port 1050 is secured to base 1054, which itself is held in place by frame 1030. Air is evacuated from port 150 via hose 1052. In this embodiment, membrane 1020 may comprise a flexible membrane such as latex rubber, and frame 1030 may be dimensioned such that it does not extend beyond membrane 1020. Thus, frame 1030 acts with other components to form a quick pick and place device that does not utilize sealant, wherein the vacuum bag has a rigid support. Note that in this example, a bi-planar mesh is being used with a flexible membrane such as latex rubber. In this instance a permeable layer does not extend beyond membrane 1020. Note that frame 1030 is particularly useful for pick and place operations, in that frame 1030 promotes separation of the vacuum bag from an object, which may make a permeable layer 130 unnecessary. Frame 1030 may therefore be placed upon an object, a vacuum drawn and maintained under the vacuum bag, at which time the object can be picked up and relocated whereupon the vacuum is removed and the supported vacuum bag is removed. In further embodiments, frame 1030 may be utilized as at least part of an end effector of an automated robotic system, and may respond based on instructions provided to actuators (not shown) that operate the end effector.

EXAMPLES

In the following examples, additional processes, systems, and methods are described in the context of a vacuum securement system.

Figure 11:
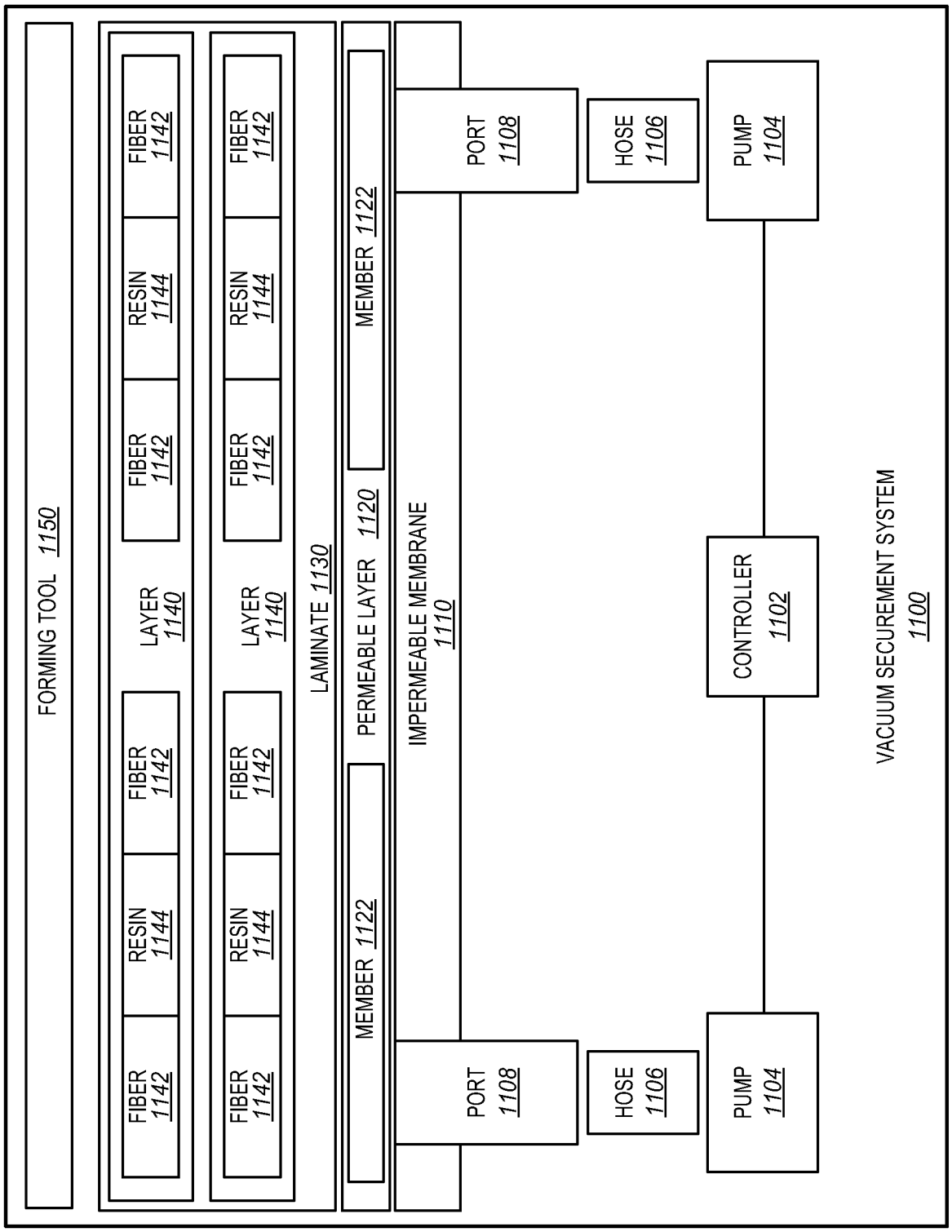
FIG. 11 is a block diagram of a vacuum securement system in an exemplary embodiment.

FIG. 11 is a block diagram of a vacuum securement system 1100 in an exemplary embodiment. According to FIG. 11, vacuum securement system 1100 includes forming tool 1150, upon which laminate 1130 is placed. Laminate 1130 includes multiple layers 1140 of material, such as dry carbon fiber, tacked performs, pick and place materials, CFRP, etc. Each layer includes multiple parallel fibers 1142 as well as resin 1144 (e.g., a thermoset or thermoplastic resin). An impermeable membrane covers laminate 1130, and permeable layer 1120 is interposed between laminate 1130 and impermeable membrane 1110. Ports 1108 and hoses 1106 provide a passageway for pumps 1104 to draw air trapped between impermeable membrane 1110 and laminate 1130. Controller 1102 manages the operations of pumps 1104. For example, controller 1102 may adjust the amount of power applied to pumps 1104 in order to ensure a constant level of pressure or airflow. That is, air being drawn out by pumps 1104 must be sufficient to offset air incursion along the perimeter of membrane 1110 due to loss of vacuum and still maintain a desired level of vacuum under the vacuum bag.

Figure 12:
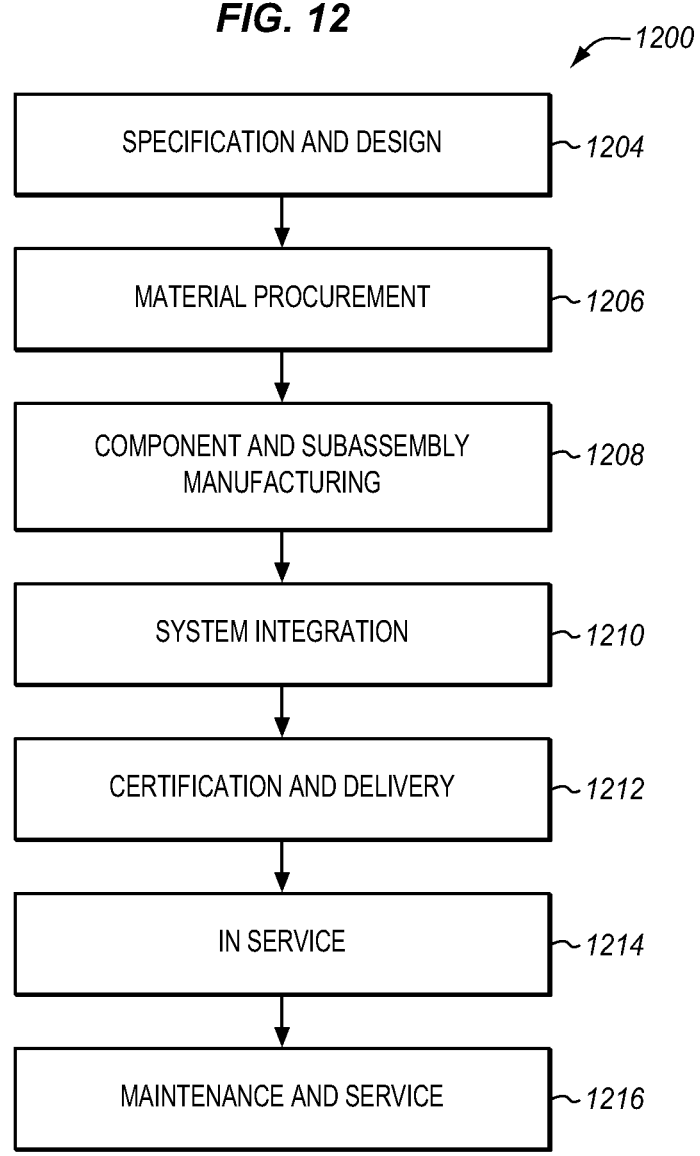
FIG. 12 is a flow diagram of aircraft production and service methodology in an exemplary embodiment.
Figure 13:
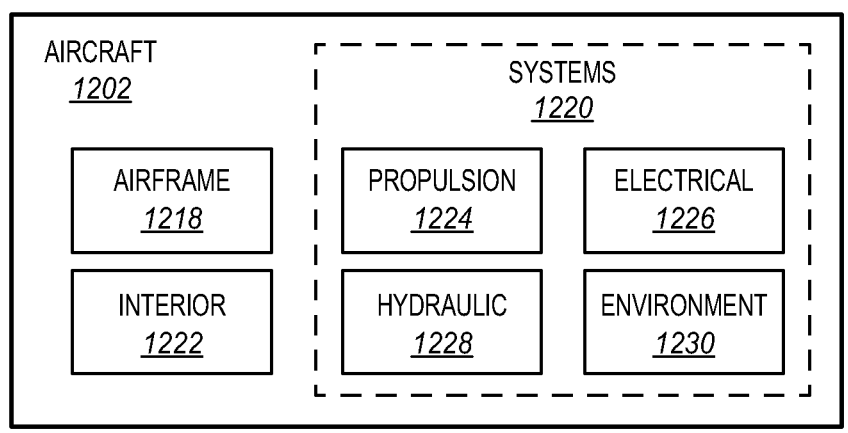
FIG. 13 is a block diagram of an aircraft in an exemplary embodiment.

Referring more particularly to the drawings, embodiments of the disclosure may be described in the context of an aircraft manufacturing and service method 1200 as shown in FIG. 12 and an aircraft 1202 as shown in FIG. 13. During pre-production, exemplary method 1200 may include specification and design 1204 of the aircraft 1202 and material procurement 1206. During production, component and sub-assembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 1216 (which may also include modification, reconfiguration, refurbishment, and so on). Apparatus and methods embodied herein may be employed during any one or more suitable stages of the production and service method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion 1224, electrical 1226, hydraulic 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by exemplary method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1200. For example, components or subassemblies corresponding to production stage 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216. For example, the techniques and systems described herein may be used for steps 1206, 1208, 1210, 1214, and/or 1216, and/or may be used for airframe 1218 and/or interior 1222. These techniques and systems may even be utilized for systems 1220, including for example propulsion 1224, electrical 1226, hydraulic 1228, and/or environmental 1230.

In one embodiment, a laminate is cured into a composite part that comprises a portion of airframe 1218, and is manufactured during component and subassembly manufacturing 1208. The composite part may then be assembled into an aircraft in system integration 1210, and then be utilized in service 1214 until wear renders the composite part unusable. Then, in maintenance and service 1216, the part may be discarded and replaced with a newly manufactured composite part. Inventive components and methods may be utilized throughout component and subassembly manufacturing 1208 in order to secure laminates that will be cured into new composite parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus comprising:
   an impermeable membrane;
   a vacuum port penetrating through the impermeable membrane;
   a pump coupled with the vacuum port that is configured to provide sufficient volumetric flow with a negative pressure to offset air leaks at edges of the impermeable membrane when the impermeable membrane is placed unaffixed against a surface of a forming tool and unsealed along a perimeter of the impermeable membrane, wherein at least a part of the perimeter directly contacts the surface, wherein the impermeable membrane is configured to cover an object on the forming tool; and
   a permeable layer that is interposed between the surface and the impermeable membrane during operation of the apparatus, and that comprises a high-flow material that facilitates airflow.

2. The apparatus of claim 1 wherein:
   the permeable layer comprises an open celled foam material.

3. The apparatus of claim 1 wherein:
   the permeable layer comprises a biplanar mesh comprising multiple layers, each layer comprising parallel structural elements.

4. The apparatus of claim 3 wherein:
   the biplanar mesh conforms to an object in response to the negative pressure applied by the pump.

5. The apparatus of claim 1 further comprising:
   a frame affixed to the impermeable membrane that secures the impermeable membrane in a predetermined configuration.

6. The apparatus of claim 1 further comprising:
   a hose coupling the pump to the vacuum port.

7. The apparatus of claim 1 wherein:
   the vacuum port is located at an end portion of the impermeable membrane.

8. The apparatus of claim 1 wherein:
   the vacuum port is located at a center portion of the impermeable membrane.

9. The apparatus of claim 1 wherein:
   the permeable layer covers a first portion of the object; and
   the apparatus further comprises:
      a second permeable layer that covers a second portion of the object;
      a second impermeable membrane that has an area greater than an area covered by defined by the second permeable layer, and covers the second permeable layer such that ends of the second impermeable membrane extend beyond ends of the second permeable layer; and
      a second vacuum port at the second impermeable membrane.

10. The apparatus of claim 9 wherein:
    the object comprises an uncured fiber reinforced laminate.

11. The apparatus of claim 9 wherein:
    the object comprises Carbon Fiber Reinforced Polymer (CFRP).

12. The apparatus of claim 9 wherein:
    the object is deformable and is placed along a curved surface of the forming tool.

13. The apparatus of claim 1 wherein:
    suction caused by the negative pressure is configured to hold the impermeable membrane in place, and a greater amount of air is evacuated by the negative pressure than is lost via leaks at ends of the impermeable membrane.

14. The apparatus of claim 1 wherein:
    the impermeable membrane comprises latex.

15. A system comprising:

an impermeable membrane that is configured to cover an object on a forming tool;

a vacuum port at the impermeable membrane;

a pump that is configured to apply a negative pressure to the vacuum port which evacuates air between the impermeable membrane and the object while the impermeable membrane is unaffixed and unsealed along a perimeter of the impermeable membrane, and at least a part of the perimeter directly contacts an upper surface of the forming tool, the negative pressure directly securing the impermeable membrane by evacuation of air between the object and the impermeable membrane; and a permeable layer that is interposed between the surface of the forming tool and the impermeable membrane during operation of the apparatus, and that comprises a high-flow material that facilitates airflow.

16. The system of claim 15 wherein:

the permeable layer covers a first portion of the object; and the system further comprises:
  a second permeable layer that covers a second portion of the object;
  a second impermeable membrane that has an area greater than an area covered by by the second permeable layer, and covers the second permeable layer such that ends of the second impermeable membrane extend beyond ends of the second permeable layer; and
  a second vacuum port at the second impermeable membrane.

17. The system of claim 15 wherein:

the object comprises an uncured fiber reinforced laminate.

18. The system of claim 15 wherein:

the object comprises Carbon Fiber Reinforced Polymer (CFRP).

19. The system of claim 15 wherein:

suction caused by the negative pressure is configured to hold the impermeable membrane at the permeable layer, and a greater amount of air is evacuated by the negative pressure than is lost via leaks at ends of the impermeable membrane.

20. The system of claim 15 wherein:

the impermeable membrane comprises latex.

21. The system of claim 15 further comprising:

a frame affixed to the impermeable membrane that secures the impermeable membrane in a predetermined configuration.

22. The system of claim 15 further comprising:

a hose coupled to the vacuum port.

23. The system of claim 15 wherein:

the vacuum port is located at an end portion of the impermeable membrane.

24. The system of claim 15 wherein:

the vacuum port is located at a center portion of the impermeable membrane.

25. The system of claim 15 wherein:

the object is deformable and is placed along a curved surface of the forming tool.

26. The system of claim 15 wherein:

the permeable layer comprises a biplanar mesh comprising multiple layers, each layer comprising parallel structural elements.

27. The system of claim 15 wherein:

the vacuum port is located directly over the permeable layer.

* * * * *